United States Patent [19]

Masuoka et al.

[11] Patent Number: 4,845,132
[45] Date of Patent: Jul. 4, 1989

[54] HYDROPHILIC POROUS MEMBRANE, METHOD FOR PRODUCTION THEREOF, AND PLASMA SEPARATOR USING SAID MEMBRANE

[75] Inventors: Toshio Masuoka; Okihiko Hirasa; Yoshio Suda, all of Ibaragi; Makoto Onishi; Yukio Seita, both of Fuji, all of Japan

[73] Assignees: Agency of Industrial Science and Technology; Terumo Kabushiki Kaisha, both of Tokyo, Japan

[21] Appl. No.: 46,449

[22] Filed: May 6, 1987

[30] Foreign Application Priority Data

May 7, 1986 [JP] Japan ................. 61-103011

[51] Int. Cl.$^4$ ............................... C08J 9/36
[52] U.S. Cl. ........................... 521/53; 521/55; 521/61; 521/74; 521/134; 521/905; 525/329.4; 525/329.7; 428/315.7; 210/490; 210/500.38; 210/927; 522/151; 522/155; 522/156; 522/161
[58] Field of Search ............ 521/53, 55, 61, 74, 521/134, 905; 210/490, 500.38, 927; 428/315.7; 625/329.4, 329.7; 522/150, 151, 155, 156, 157, 161

[56] References Cited

U.S. PATENT DOCUMENTS

| | | | |
|---|---|---|---|
| 4,256,782 | 3/1981 | Tazuke et al. | 427/53.1 |
| 4,331,719 | 5/1982 | Ragas et al. | 427/393.5 |
| 4,353,799 | 10/1982 | Leonard | 210/321.3 |
| 4,407,846 | 10/1983 | Machi et al. | 427/35 |
| 4,618,533 | 10/1986 | Steuck | 428/315.7 |
| 4,695,592 | 9/1987 | Itoh et al. | 521/54 |

FOREIGN PATENT DOCUMENTS

| | | |
|---|---|---|
| 1290717 | 2/1961 | Fed. Rep. of Germany . |
| 2725477 | 12/1977 | Fed. Rep. of Germany . |
| 17978 | 2/1979 | Japan . |
| 38333 | 4/1981 | Japan . |
| 93734 | 6/1983 | Japan . |
| 160504 | 9/1984 | Japan . |
| 920860 | 3/1963 | United Kingdom . |
| 2058802 | 4/1981 | United Kingdom . |
| 2089285 | 6/1982 | United Kingdom . |

OTHER PUBLICATIONS

Patents Abstracts of Japan, vol. 5, No. 71, May 13, 1981.
Patent Abstracts of Japan, vol. 8, No. 283, Dec. 25, 1984.
Kogyo Zairyo (Industrial Materials), vol. 31, No. 7, pp. 62–99.

Primary Examiner—John Kight
Assistant Examiner—Samuel A. Acquah
Attorney, Agent, or Firm—Burns, Doane, Swecker & Mathis

[57] ABSTRACT

A hydrophilic porous membrane has graft chains of a hydrophilic monomer formed on the surface of a hydrophobic porous membrane so as to impart to the surface perfect hydrophilicity such that the produced membrane, when wetted, exhibits a swelling ratio of not more than 1% and a bubble point in the range of 0.5 to 8 kg/cm$^2$. The hydrophilic porous membrane is produced by irradiating the hydrophobic porous membrane with plasma, feeding the hydrophilic monomer in a gaseous state, and allowing the hydrophilic monomer to be graft polymerized on the surface of the porous membrane. A plasma separator is obtained by using the aforementioned hydrophilic porous membrane as a plasma separation membrane.

23 Claims, 6 Drawing Sheets

HYDROPHILIC POROUS MEMBRANE, METHOD FOR PRODUCTION THEREOF, AND PLASMA SEPARATOR USING SAID MEMBRANE

BACKGROUND OF THE INVENTION

1. Field of the Invention

This invention relates to a hydrophilic porous membrane, to a method for the production of the membrane, and to a plasma separator using the hydrophilic porous membrane. More particularly, it relates to a hydrophilic porous membrane which exhibits prominent dimensional stability and strength while in use and succumbs sparingly to degradation of membrane qualities, to a method for the production of the membrane, and to a plasma separator using the hydrophilic porous membrane.

2. Description of the Prior Art

The separation of substances as by filtration or dialysis using macromolecular porous membranes has found utility in numerous applications owing to its advantages in operability and economy. Generally, in the separation of aqueous media such as aqueous solutions and blood, either hydrophilic porous membranes are used or hydrophobic porous membranes which have undergone a treatment for impartation of hydrophilicity are used.

As hydrophilic porous membranes, porous membranes of cellulose derivatives, particularly cellulose acetate, which possess high water permeability are in wide prevalence. These cellulose derivatives, however, are deficient in resistance to acids, alkalis, and organic solvents and they also have the drawback of readily deforming on exposure to heat and pressure. Thus, they are used only under heavily limited conditions. Further, the cellulose derivatives, on contact with water, swell. When a porous membrane made of such a cellulose derivative as described above incorporated a device and put to use, this phenomenon of swelling causes the porous membrane to deform itself and furrow its surface possibly to the extent of obstructing flow paths formed in the device, inducing the phenomenon of channeling, and preventing the membrane from discharging its function sufficiently. When a porous membrane made of cellulose acetate is adopted in the biomedical field as for plasma separation, this membrane is suffered to activate the complementary elements in the body fluid and entail difficulties even from the standpoint of bioadaptability.

In contrast, hydrophobic porous membranes generally enjoy high strength, excellent chemical resistance and other highly desirable properties inherent in hydrophobic macromolecules which form the membranes and they do not swell in water and, therefore, entail none of the difficulties mentioned above. Under widely practiced conditions of filtration (for example, a filtration pressure of not more than 1 kg/cm$^2$), however, the porous membranes do not permit passage of water through their continued pores. Thus, these membranes must be treated so that their pores will acquire a hydrophilic surface. As means of treatment for producing the hydrophilic surface, the organic solvent-water substitution method which produces this surface by immersing the hydrophobic porous membrane in an organic solvent such as, for example, ethanol or other alcohol and then displacing the organic alcohol contained in the membrane with water and the coating method which produces the surface by coating the hydrophobic membrane with a surfactant or with glycerol or polyvinyl alcohol or with a hydrophilic polymer have been well known. Unfortunately, these methods are incapable of imparting permanent hydrophilicity to the membrane. Each time the membrane has lost this hydrophilicity, therefore, it must be treated for restoration of the hydrophilicity. This inevitable repetition of the treatment adds to the complexity of the use of this membrane. To be specific, the membrane treated by the former method loses the hydrophilicity after it is dried and the membrane treated by the latter method loses the hydrophilicity after the coating compound has flowed out of the membrane. Many attempts are being made to impart semipermanent hydrophilicity to hydrophobic porous membranes. They encounter many problems, however, because they are porous by nature. No method has yet been established which is capable of permitting perfect impartation of the semipermanent hydrophilicity. The method which imparts a hydrophilic group to the surface of a membrane by a treatment using an aqueous solution of an Laid-Open such as sodium hydroxide or potassium hydroxide (Japanese Patent Laid-Open No. SHO 58(1983)-93,734) has the possibility of the membrane losing strength by the action of the alkali and entails the problem of difficult control of the conditions of the treatment. The method which resorts to the steps of immersing a hydrophobic porous membrane in an alcohol, then treating the impregnated membrane with an aqueous water-soluble polymer solution, drying the treated membrane, and thereafter treating the membrane as with heat or a radiant ray thereby insolubilizing the water-soluble polymer remaining on the membrane (Japanese Patent Publication No. SHO 54(1979)-17,978, Japanese Patent Laid-Open No. SHO 56(1981)-38,333, etc.) has a strong possibility of consuming a great deal of time during the step of immersion in the alcohol through the step of substitution with the aqueous polymer solution, degrading the membrane strength under the influences of heat or radiant ray during the treatment for insolubilization, and causing variation of diameters of pores in the membrane. Moreover, this method has room for solution with respect to equipment, safety, and cost.

The plasma modification method accomplishes the impartation of hydrophilicity by irradiating the surface of a hydrophobic macromolecular membrane with a plasma. Since the hydrophilicity created by this treatment is gradually degraded with elapse of time (Professor Ikada, Kyoto University "Kogyo Zairyo: Vol. 31, No. 7, pages 62–69), this method has a critical disadvantage that it is incapable of imparting lasting hydrophilicity.

Further, the practice, of imparting hydrophilicity by producing points of activity on the surface of a hydrophobic macromolecule and graft polymerizing a hydrophilic monomer on the macromolecule has found acceptance. When the graft polymerization is effected by using such a radiant ray as electron ray or $\gamma$ ray which possesses a high penetrating force, this method suffers from loss of the strength of basic material and entails unsolved problems concerning equipment, safety, and cost. Further, the graft polymerization causes the organic macromolecule which has nothing to do with the graft polymerization to form an ungrafted homopolymer. Thus, this method has much to be desired regarding effectiveness and efficiency. Studies are now devoted to development of a graft polymerization method using a plasma, chiefly for the modification of surface of macromolecular basic materials. By the method using ordinary plasma, since the penetrating force of plasma is weak as compared with that of the radiant ray, the surface of such minute openings as pores inside a porous membrane is not easily treated effectively. It has been held that the depth from the outer surface of a macromolecular material in which the treatment with plasma produces the desired effect thereof is only several microns at most (pages 11–13 of Japanese Patent Laid-Open No. SHO 56(1981)-38,333 and Kogyo Zairyo, Vol. 31, No. 7, pages 62–69). Conceivably, impartation of hydrophilicity deeply into the interior of a porous material may be obtained by amply increasing the amount of grafting. When the amount of grafting is increased, however, there ensues the disadvantage that the pores in the porous membrane are clogged so heavily as to prevent the membrane from providing ample permeating of water or the pores have their diameters so heavily varied as to impede the membrane from fulfilling the function of a molecular sieve (separation membrane). Further, since the membrane is suffered to swell so much under a moist condition, the membrane incorporated in a device and put to use entails a critical disadvantage that the membrane will induce the phenomenon of channeling as described above. Recently, the case of application of plasma to the treatment for impartation of hydrophilicity to a hydrophobic membrane has been reported (Japanese Patent Laid-Open No. SHO 59(1984)-160,504). Unlike the conventional plasma treatment which aims to cause reaction of a gaseous monomer in the presence of plasma, this method makes use of the so-called plasma graft polymerization which comprises irradiating a given basic material with plasma thereby forming points of activity such as radicals on the surface of the basic material and then subjecting the basic material to polymerization in an aqueous monomer solution in the absence of plasma. This method is claimed to permit desired control of the graft polymerization ratio. This method, however, has not been demonstrated to be capable of permitting impartation of perfect hydrophilicity to the surface of pores in the porous membrane in a relatively low graft ratio enough to preclude the drawbacks mentioned above. When the graft polymerization is effected with any of the hydrophilic unsaturated monomers enumerated in the specification, the grafted layer is formed toward the outside on the porous membrane as the basic material because the unsaturated monomer has poor affinity for the hydrophobic macromolecule forming the basic material. It is considered that since the monomer is supplied abundantly in the form of a solution, the growth of graft chains proceeds vigorously and the development of the grafted layer near the outer surface of the porous membrane with relatively rich distribution of points of activity produced by plasma irradiation occurs very quickly as compared with the develpment of the grafted layer deep inside the membrane. It naturally follows that the graft layer fully developed near the outer surface of the porous membrane before the impartation of the perfect hydrophilicity proceeds thoroughly to the surface of pores inside the porous membrane will clog the pores in the porous membrane. Even from the commercial point of view, this method has the disadvantage that the monomer is heavily wasted and the operability is lowered because the reaction occurs in the liquid phase. It has been demonstrated by the inventors that when the same mechanism of polymerization initiated by plasma is applied to the combination of high mutual affinity between the substrate of N,N-dimethyl acrylamide and the porous membrane of polypropylene, the grafted layer attains its development deeply inside the substrate. There is the possibility, however, that since the monomer is supplied in the form of a solution to the reaction the grafted layer will develop so much as to lower the strength of the substrate. This method can not be called very suitable for the purpose of imparting hydrophilicity to a hydrophobic porous membrane intended for use in filtration or dialysis.

This invention aims to provide a novel hydrophilic porous membrane, a method for the production thereof, and a plasma separation using the hydrophilic porous membrane. This invention also aims to provide a hydrophilic porous membrane exhibiting prominent dimensional stability and strength while in use and succumbing only sparingly to degradation of membrane qualities, a method for the production thereof, and a plasma separator using the hydrophilic porous membrane. This invention further aims to provide a hydrophilic porous membrane possessing out-standing water permeability owing to the impartation thereto of lasting hydrophilicity at no sacrifice of highly desirable physical properties inherent in a hydrophobic porous membrane, method for the production thereof, and a plasma separator using the hydrophilic porous membrane. Further, this invention aims to provide a hydrophilic porous membrane enjoying great advantages in terms of equipment, safety and cost, a method for the production thereof, and a plasma separator using the hydrophilic porous membrane.

SUMMARY OF THE INVENTION

The objects described above are accomplished by a hydrophilic porous membrane which is characterized by a process of manufacture which comprises forming graft chains of a hydrophilic monomer on the surface of a hydrophobic porous membrane thereby imparting to the surface perfect hydrophilicity such that the produced membrane, when wetted, exhibits a swelling ratio of not more than 1% and a bubble point in the range of 0.5 to 8 $kg/cm^2$.

This invention also discloses a hydrophilic porous membrane wherein the graft chains of a hydrophilic monomer are formed on the surface of the hydrophobic porous membrane by irradiating the outer surface of the porous membrane in an unstrained state with plasma and allowing the hydrophilic monomer supplied in a gaseous state to be graft polymerized onto the outer surface. This invention further discloses a hydrophilic porous membrane wherein a hydrophobic porous membrane is made of a polyolefin or a partially chlorinated or fluorinated polyolefin. This invention also discloses a hydrophilic porous membrane wherein a hydrophobic porous membrane is made of polyvinylidene fluoride. This invention additionally discloses a hydrophilic porous membrane having a wall thickness in the range of 20 to 250 $\mu m$. Further, this invention discloses a hydrophilic porous membrane wherein a hydrophobic porous membrane possesses no skin layer on the outer surface portion thereof. This invention also discloses a hydrophilic porous membrane wherein a hydrophilic monomer is N,N-dimethyl acrylamide. This invention further discloses a hydrophilic porous membrane which, when wetted, exhibits a swelling ratio in the range of 0 to 0.5% and a bubble point in the range of 0.8 to 2.0 $kg/cm^2$.

The objects described above are also accomplished by a method for the production of a hydrophilic porous membrane, by the steps of irradiating the outer surface of a hydrophobic porous membrane in an unstrained state with plasma and subsequently supplying a hydrophilic monomer in a gaseous state thereby enabling the hydrophilic monomer to be graft polymerized on the surface of the porous membrane.

This invention discloses a method for the production of a hydrophilic porous membrane wherein a hydrophobic porous membrane has a wall thickness in the range of 20 to 250 μm. This invention further discloses a method for the production of a hydrophilic porous membrane wherein a hydrophobic porous membrane possesses an average pore diameter in the range of 0.5 to 1.0 μm. This invention discloses a method for the production of hydrophilic porous membrane wherein a hydrophobic porous membrane is made of a polyolefin or a partially chlorinated or fluorinated polyolefin. This invention also discloses a method for the production of a hydrophilic porous membrane wherein a hydrophobic porous membrane is made of polypropylene. Further, this invention discloses a method for the production of a hydrophilic porous membrane wherein a hydrophobic porous membrane is made of polyvinylidene fluoride. This invention discloses a method for the production of a hydrophilic membrane wherein a hydrophilic monomer is N,N-dimethyl acrylamide. Further, this invention discloses a method for the production of a hydrophilic porous membrane wherein the polymerization is carried out under conditions such that the graft ratio falls in the range of 2 to 30%.

The objects mentioned above are further accomplished by a plasma separator, characterized by possessing as a plasma separation membrane, a hydrophilic porous membrane which is characterized by a process of manufacture which comprises forming graft chains of a hydrophilic monomer on the surface of a hydrophobic porous membrane thereby imparting to the surface perfect hydrophilicity such that the produced membrane, when wetted, exhibits a swelling ratio of not more than 1% and a bubble point in the range of 0.5 to 8 kg/cm$^2$.

This invention discloses a plasma separator wherein a plasma separation membrane possesses a permeability of not less than 90% to total proteins of plasma. This invention also discloses a plasma separator wherein a plasma separation membrane is a hydrophilic porous membrane produced by a process which comprises irradiating the outer surface of a hydrophobic porous membrane in an unstrained state with plasma and subsequently causing a hydrophilic monomer supplied in a gaseous form to be graft polymerized onto the surface of the hydrophobic porous membrane and allowing the graft chains formed consequently on the surface of the hydrophobic porous membrane to impart perfect hydrophilicity to the hydrophilic porous membrane. This invention also discloses a plasma separator wherein a hydrophobic porous membrane is made of polyolefin or a partially chlorinated or fluorinated polyolefin. This invention further discloses a plasma separator wherein a hydrophobic porous membrane is made of polypropylene. This invention additionally discloses a plasma separator wherein a hydrophobic porous membrane is made of polyvinylidene fluoride. Further, this invention discloses a plasma separator wherein a hydrophilic monomer is 2-hydroxyethyl methacrylate or N,N-dimethyl acrylamide. This invention discloses a plasma separator having a wall thickness in the range of 20 to 250 μm. Further, this invention discloses a plasma separator wherein a hydrophilic porous membrane, when wetted, exhibits a swelling ratio in the range of 0 to 0.5% and a bubble point in the range of 0.8 to 2.0 kg/cm$^2$.

The term "surface" of a porous membrane as used in the present specification does not mean the simple outer surface of the porous membrane but means the surface of the porous membrane so widely as to embrace also the surface of pores distributed in the membrane interior. Thus, the expression surface of the surface of a hydrophobic porous membrane is rendered perfectly hydrophilic designates the condition in which perfect hydrophilicity is imparted not only to the surface of the hydrophobic porous membrane but also to the surface of pores distributed in the membrane interior.

BRIEF DESCRIPTION OF THE INVENTION

PREFERRED EMBODIMENT OF THE INVENTION

Now, the present invention will be described more specifically below with reference to working examples.

The hydrophilic porous membrane of the present invention is a product obtained by forming graft chains of a hydrophilic monomer on the surface of a hydrophobic porous membrane thereby imparting perfect hydrophilicity to the surface of the hydrophobic porous membrane. This hydrophilic porous membrane, when wetted, exhibits a swelling ratio of not more than 1%, preferably in the range of 0 to 0.5%, and a bubble point in the range of 0.5 to 8 kg/cm$^2$ preferably 0.8 to 2.0 kg/cm$^2$. As clearly noted from these properties, the graft chains of the hydrophilic monomers serving to impart hydrophilicity completely cover not only the outer surface of the hydrophobic membrane but also the surface of pores distributed in the membrane interior and, notwithstanding this fact, the graft chains are not fully developed to the extent of affecting the pore characteristics inherent in the hydrophobic porous membrane but are developed in a very thin layer bound to the surface. The bubble point, as universally known, represents the magnitude dependent on the maximum pore diameter of a given porous membrane.

The hydrophilic porous membrane of the present invention which possesses the qualities mentioned above is obtained by activating the surface of a hydrophilic porous membrane by the treatment with plasma and graft polymerizing a hydrophilic monomer to the activated surface. The "plasma" to be used in the present invention is a low-temperature low-pressure gas plasma which can be generated by the conventional method. Generally, it is generated by exciting the gas with an electric energy. The electric energy thus used effectively for the excitation ranges from a direct current to a microwave. The supply of this electric energy can be effected by means of capacitive coupling or inductive coupling, whichever suits the occassion better. Otherwise it can be effected by the internal electrode method or the external electrode method. Generally, the plasma is generated by introducing a gas such as nitrogen, hydrogen, argon, or air under a pressure in the range of $10^{-3}$ to 10 Torrs and applying to the gas an electric power in the range of 0.1 to 300 W with the aid of a high frequency oscillator.

First, the plasma thus generated is projected on a hydrophobic porous membrane generally for a period approximately in the range of 1 to 60 seconds to activate the surface of the hydrophobic porous membrane. The conditions for this plasma treatment are not easily defined, because they are variable with the capacity of the reaction vessel, the size of a given sample subjected to the treatment, and the kind of the device adopted. It has been demonstrated that for the plasma treatment to permit formation of active points uniformly not merely on the outer surface portion of the hydrophilic porous membrane but also on the surface of pores distributed in the membrane interior, the outer surface of the hydrophobic porous membrane, during the irradiation with the plasma, should be kept in an unstrained state, namely in a state such that the hydrophobic porous membrane will not contact the wall surface of the reaction vessel or the hydrophobic porous membrane will not be mounted as on a support base. When the plasma treatment is carried out on the hydrophobic porous membrane while the outer surface on one side of the porous membrane is adhering to the wall surface of the reaction vessel, for example, the grafted layer of the hydrophilic monomer is mainly formed only in the outer surface portion directly exposed to the plasma or the high-energy ray issuing from the plasma. Thus, no perfect impartation of hydrophilicity can be obtained on the surface of the hydrophobic porous membrane.

On the surface of the hydrophobic porous membrane which has undergone the plasma treatment performed as described above, there are formed active seeds. When the porous membrane is made of a polyolefin type material, for example, highly reactive alkyl radicals are mainly formed on the substrate. These radicals are quickly converted into peroxide on contact with oxygen. When the hydrophilic monomer is supplied in a gaseous state in the absence of the plasma to the porous membrane which has undergone the plasma treatment of the foregoing description, the active seeds on the surface of the porous membrane begin to consume the monomer and set the so-called graft polymerization proceeding. The graft polymerization can be made to proceed by means of the alkyl radical instead of the exposure to oxygen. After the active seeds have been converted into the peroxide, the peroxide may be subjected to cleavage by heating or with a metal ion to induce generation of a radical and promote the graft polymerization.

For the graft polymerization, the hydrophilic monomer is supplied in the gaseous state because the graft polymerization will proceed unduly vigorously and the development of the grafted layer will not evenly proceed between the outer surface portion of the porous membrane and the surface of pores distributed in the membrane interior where the hydrophilic monomer is supplied in the form of a solution. In the mechanism for initiating polymerization with plasma, it is generally customary for the chain polymerization reaction of the monomer after the exposure to the plasma to be carried out in a solution or a solid. Surprisingly, it has been demonstrated that the chain polymerization reaction proceeds amply and advantageously even when the monomer is supplied in a gaseous state or a gas phase.

The graft polymerization is carried out generally at a temperature in the range of 0° C. to 80° C., preferably 2° C. to 60° C., under a pressure in the range of $10^{-2}$ to $10^4$ Torrs, preferably 1 to $10^3$ Torrs. The graft reaction completes in the period of 10 seconds to 60 minutes. The amount of the graft polymer can be controlled by the conditions of graft polymerization (such as temperature, monomer concentration, and reaction time) and the conditions of plasma irradiation. The graft ratio is desired to fall in the range of 2 to 30%, preferably 5 to 15%. If the graft ratio is less than 2%, there is the possibility that the impartation of hydrophilicity to the hydrophobic porous membrane will not be sufficiently obtained. If the graft ratio exceeds 30%, there is the possibility that the pore diameters inherent in the hydrophobic porous membrane will be decreased to the extent of clogging the pores and the membrane, when wetted, will be expanded and deformed.

The hydrophobic porous membrane used as a substrate herein is a porous membrane of the type formed of a hydrophobic macromolecular substance and possessed of pores incapable of being pregnated with water. This invention does not discriminate the hydrophobic porous material by the kind of its raw material. The material of the hydrophobic porous membrane, however, is desired to exhibit outstanding physical and chemical characteristics. As typical examples of the material, there may be cited polyolefins such as polyethylene and polypropylene, partially chlorinated or fluorinated polyolefins such as ethylenedichlorodifluoroethylene copolymer polyamides such as nylon 6 and nylon 6,6, saturated polyesters such as polyethylene terephthalate, and polyacrylonitrile, and polyvinylidene fluoride. Among other advantageous materials cited above, polyolefins, partially chlorinated or fluorinated polyolefins, and polyvinylidene fluoride prove desirable. The best choice among them is polypropylene. The hydrophobic porous membrane is desired to have a shape such that the active seeds can be sufficiently produced on the surface of pores in the interior of the porous membrane by the treatment with plasma of low penetrating force. The membrane is desired to possess a wall thickness in the range of 20 to 250 $\mu$m, preferably 30 to 150 $\mu$m. If the wall thickness of the membrane exceeds 250 $\mu$m, there is the possibility that the impartation of hydrophilicity by the treatment with plasma will not be attained even on the surface of pores in the membrane interior. The pores in the porous membrane interior are desired to have diameters in the range of 0.05 to 1.0 $\mu$m, preferably 0.2 to 0.5 $\mu$m.

The hydrophilic monomer to be used herein for the formation of graft chains is a monomer which is only required to possess an unsaturated vinyl or allyl group, exhibit hydrophilicity, and undergo ordinary radical polymerization. There are acryl type, methacryl type, unsaturated amide type, diene type, and triene type monomers which meet the requirement mentioned above. As typical examples of such monomers, there can be cited (meth)acrylamides, N-methyl(meth)acrylamides, N,N-dimethyl(meth)acrylamides, N,N-methylethyl(meth)acrylamides, N,N-diethyl(meth)acrylamides, (meth)acrylic acids, 2-hydroxyethyl(meth)acrylates, N,N-dimethylaminoethyl(meth)acylates, N,N-diethylaminoethyl(meth)acrylates, N-vinyl pyrrolidone, p-styrene sulfonic acid, vinyl sulfonic acid, 2-methacryloyl oxyethyl sulfonic acid, 3-methacryloyl oxy-2-hydroxypropyl sulfonic acid, allyl sulfonic acid, methacryl sulfonic acid, and 2-acrylamide-2-methylpropane sulfonic acid. Among the hydrophilic monomers cited above, those which possess affinity for the hydrophobic macromolecular substance for the hydrophobic porous membrane and exhibit high polymerization velocity prove particularly desirable. Where the hydrophobic porous membrane is made of polypropylene, for example N-N-dimethyl acrylamide proves the best choice among the monomers enumerated above. Where the hydrophilic porous membrane finally produced is intended to be used as a plasma separator in the biomedical field, for example, the polymer produced from the hydrophilic monomer is desired to excel in bioadaptability. From this point of view, the hydrophilic monomer is particularly desired to be 2-hydroxy methacrylate.

The hydrophilic monomers enumerated above are not always required to be used independently. Optionally, these hydrophilic monomers may be used in the form of a mixture of two or more members. The hydrophilic monomer may partially incorporate therein a hydrophobic unsaturated monomer to the extent that the incorporated unsaturated monomer will not jeopardize the object of impartation of hydrophilicity.

The hydrophilic porous membrane of this invention which is obtained as described above has a configuration such that a thin uniform grafted layer is bound to the surface of the hydrophobic porous membrane so as to cover the surface entirely. Thus, the hydrophilic porous membrane is enabled to enjoy to advantage the outstanding physical and chemical characteristics inherent in the hydrophobic porous membrance used as the substrate and, at the same time, acquires perfect hydrophilicity owing to the graft layer formed on the surface thereof. Further, since the grafted layer is thin and uniform, the pore characteristics inherent in the hydrophobic porous membrane are not appreciably degraded. Thus, the produced hydrophilic porous membrane possesses a bubble point in the range of 0.5 to 8 $kg/cm^2$. If the bubble point exceeds 8 $kg/cm^2$, the hydrophilic porous membrane fails to acquire a sufficiently high water permeability. The membrane has a swelling ratio of not more than 1%. When this porous membrane is incorporated in a device and put to use, it can never gather furrows on the surface so heavily as to impede the smooth flow of liquid under treatment through the flow path.

The hydrophilic porous membrane of the present invention can find extensive utility, depending on the pore characteristics thereof, as a precision filtration membrane, an ultrafiltration membrane, a reverse osmosis membrane, or a dialysis membrane in a varying aqueous medium or as a material for high-performance materials. A plasma separation membrane constitutes itself one of the particularly desirable applications found for the hydrophilic porous membrane of this invention.

Figure 1:
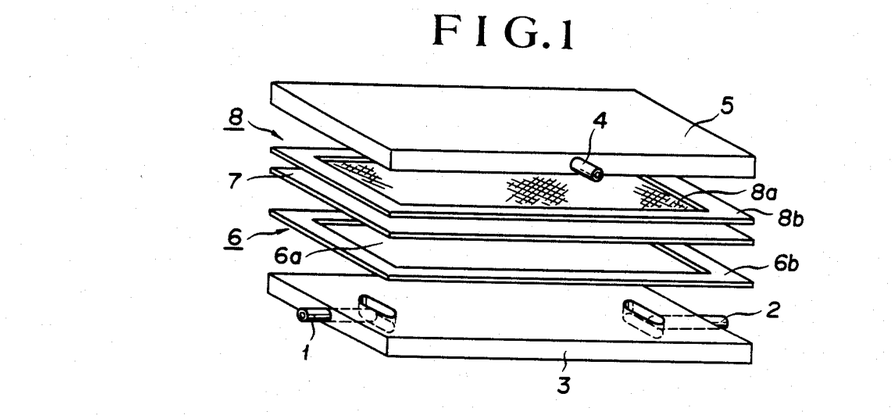
FIG. 1 is a perspective illustrating one embodiment of the plasma separator of the present invention.

FIG. 1 is a diagram illustrating one embodiment of a plasma separator possessing as a plasma separation membrane the hydrophilic porous membrane of the present invention. This plasma separator is obtained by superposing, between 1 lateral plate 3 provided with a blood inlet part 1 and a filtration residue outlet part 2 and a lateral plate 5 provided with a filtrate outlet part 4, a flow path forming plate 6 embracing an empty space in a packing part 6b of the shape of a rectangular frame, a plasma separation membrane 7, and a filtrate flow path forming plate 8 provided around a reticular filtrate flow path part 8a with a packing 8b and pressing all the members mentioned above watertightly and fixing them integrally. As the plasma separation membrane 7, the hydrophilic porous membrane of this invention produced as described above is used. The hydrophilic porous membrane which is used as the plasma separation membrane 7 is obtained by forming graft chains of a hydrophilic monomer on the surface of a hydrophobic porous membrane thereby imparting to the surface perfect hydrophilicity such that the produced membrane, when wetted, exhibits a swelling ratio of not more than 1% and a bubble point in the range of 0.6 to 2.0 $kg./cm^2$. Desirably, this membrane has a permeability of not less than 90% to total proteins of the plasma. In this separator, the blood which has flowed in through the blood inlet part 1 is advanced through the empty space 6a and filtered through the plasma separation membrane 7. The blood corpuscle portion is discharged through the filtration residue outlet part 2 and the plasma occurring as the filtrate is passed through the flow part 8a and discharged through the filtrate outlet part 4.

The plasma separator configured as described above, in terms of the performance of filtration, possesses the following characteristics. Since the plasma separation membrane possesses perfect acquired hydrophilicity and exhibits a bubble point in the range of 0.6 to 2.0 $kg/cm^2$, it provides an extremely large capacity for filtration of plasma and effects the filtration safely without entailing any removal of plasma protein component.

It is known that in the plasma separator of this class, the wall shear velocity of the filtration membrane increases and the filtration properties are enhanced in proportion as the thickness of the blood flow path decreases. In the separator illustrated in FIG. 1, the thickness of the flow path formed of the empty space 6a for permitting flow of the blood can be decreased by decreasing the thickness of the flow path forming plate 6. In the case of the conventional plasma separation membrane such as, for example, a porous membrane made of cellulose acetate, since this membrane possesses a high swelling ratio and tends to deform when wetted, the flow path formed by the empty space 6a for passage of the blood is not allowed to retain intact the thickness thereof which is fixed by the thickness of the flow path forming plate 6 and this thickness of the flow path is heavily dispersed even to the extent of inducing the phenomenon of channeling. In contrast in the plasma separator of the present invention, since the plasma separation membrane possesses highly desirable dimensional stability such that the membrane, when wetted, exhibits a swelling ratio of not more than 1%. Even when the flow path is given a small thickness such as to ensure provision of a desired capacity for filtration, the flow path is allowed to acquire a uniform thickness and has no possibility of inducing the phenomenon of channeling. The apparatus of a very simple construction illustrated in FIG. 1, therefore, acquires highly desirable filtration properties.

Further in the plasma separation membrane used in the separator, when the grafted layer deposited on the surface of the hydrophobic porous membrane is formed of a hydrophilic monomer of high blood adaptability such as, for example, 2-hydroxyethyl methacrylate, the possibility of the grafted layer activating the complementary component of the blood under treatment is little.

FIG. 1 illustrates a plasma separator possessing the most fundamental configuration as one embodiment of the plasma separator of the present invention. This invention does not discriminate the plasma separator by the shape, mode, etc. thereof and only requires this separator to possess at least as the plasma separation membrane thereof a hydrophilic porous membrane of the foregoing description. Of course, this separator is allowed to use a plurality of such plasma separation membranes.

Now, the present invention will be described more specifically below with reference to working examples.

The numerical values indicated in the following working examples and controls were determined based on the following respective definitions.

Graft ratio

A given membrane which had undergone grafting was washed with a good solvent for about 50 hours, vacuum dried, and weighted (Wg). The graft ratio was determined based on the difference between this weight, $W_g$, and the weight of the membrane, $W_O$, before the grafting, as follows.

$$(\text{Graft ratio}) = \frac{W_g - W_o}{W_o} \times 100\ (\%)$$

Swelling ratio

In a thermal mechanical analyzer (produced by Seiko Denshi Kogyo K.K. and marketed under Product Code "TMA"), a sample was set so as to measure 15 mm in length and 5 mm in width, immersed in distilled water, left standing under a load of 5 g for three minutes, and measured for wet length, $l_w$. The swelling ratio was determined based on the difference between the length, $l_W$, and the length before wetting, $l_{o'}$, as follows.

$$(\text{Swelling ratio}) = \frac{l_w - l_o}{l_o} \times 100\ (\%)$$

Bubble point

This property was determined with isopropyl alcohol, in accordance with the method defined by ASTM F316.

Permeability to total proteins in plasma

A given membrane was tested for filtration of bovine blood under filtration pressure of not more than 100 mmHg to determine whether or not it would stably exhibit a permeability of not less than 90% to total proteins of plasma.

$$(\text{Permeability}) = \frac{C_f}{C_{in}} \times 100\ (\%)$$

wherein $C_{in}$ stands for the concentration on the blood flow path side and $C_f$ for the concentration on the filtrate side.

In this case, the concentration was measured by the buret method.

EXAMPLE 1

A dope for the production of a membrane was prepared by combining polypropylene, liquid paraffin, and additives, extruded through a T die, then cooled and solidified in liquid paraffin, dissolved in a solvent for expulsion of the liquid paraffin by extraction, and thermally set. Consequently, there was obtained a hydrophobic porous membrane having an average pore diameter of 0.45 μm and a wall thickness of 80 to 120 μm. A circle 47 mm in diameter was punched out of the porous membrane and set in place inside a reaction vessel 30 mm in inside diameter in such a manner that it would not touch the wall of the vessel. Under 0.1 Torr of argon gas, an electric power of 10 W generated by an induction coil connected to a 13.56 MHz high-frequency wave generator was applied to give rise to plasma, which was projected to the membrane for 10 seconds. After the irradiation with the plasma, N,N-dimethyl acrylamide gas was introduced into the reaction vessel and allowed to undergo graft reaction at 20° C. under 1 Torr for 10 minutes. The membrane consequently obtained was washed in a Soxhlet extractor using methanol for 50 hours and vacuum dried to be used as a sample. This sample showed a graft ratio of 13.25% and was found to have acquired hydrophilicity deep to the membrane interior. It showed a permeability of 2.2 ml/min. cm$^2$ under a pressure of 0.7 kg/cm$^2$. The hydrophilic porous membrane thus produced enjoyed highly satisfactory dimensional stability such that the bubble point thereof was 1.32 kg/cm$^2$ and the swelling ratio was not more than 0.2%.

EXAMPLES 2-8

Control 1

Figure 2:
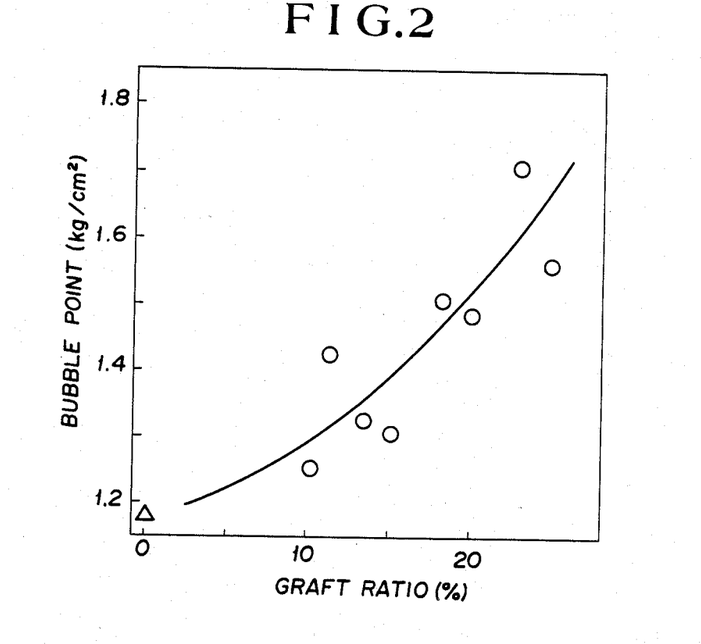
FIG. 2 is a graph showing the relation of the graft ratio and the bubble point obtained of the hydrophilic porous membrane of the present invention.

The same porous membrane of polypropylene as used in Example 1 was subjected to the same treatment for impartation of hydrophilicity as in Example 1 under the conditions shown in Table 1. All the hydrophilic porous membrane consequently obtained were invariably found to have acquired hydrophilicity deep to their interior. For comparison (Control 1), the qualities of the porous membrane of polypropylene before the treatment for acquisition of hydrophilicity are also shown in Table 1. FIG. 2 shows the relation between the bubble point and the grafting ratio of each of the hydrophilic porous membranes.

Figure 3:
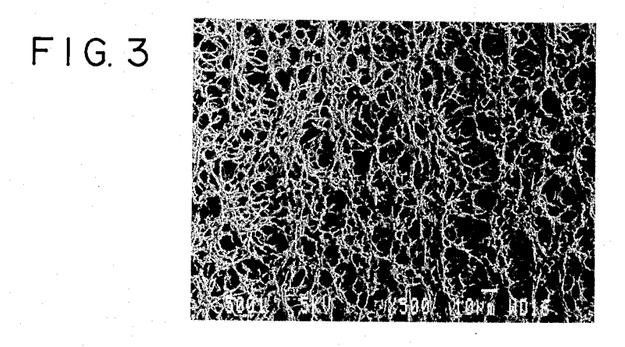
FIGS. 3-6 are electron photomicrographs showing structures of one embodiment of the hydrophilic porous membrane of this invention.
Figure 4:
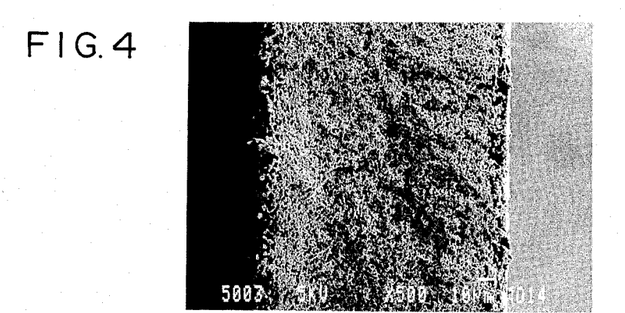
Figure 5:
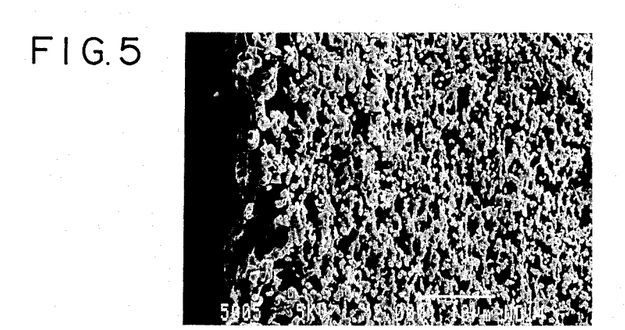
Figure 6:
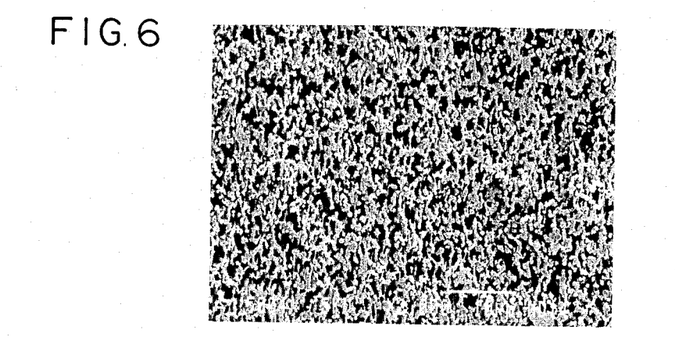
Figure 7:
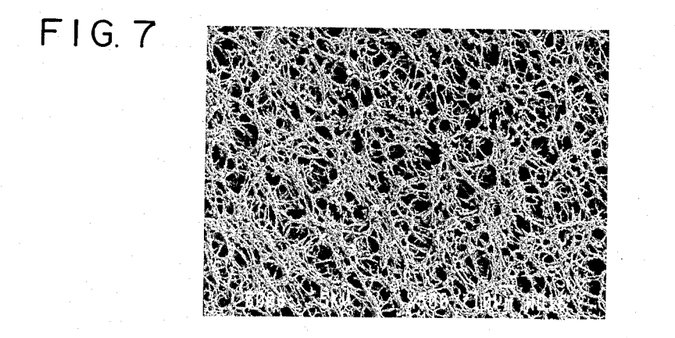
FIGS. 7-10 are electron photomicrographs showing the structures of a hydrophobic porous membrane serving as a substrate.
Figure 8:
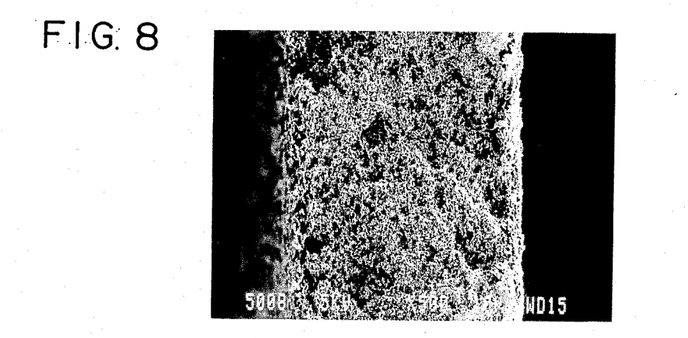
Figure 9:
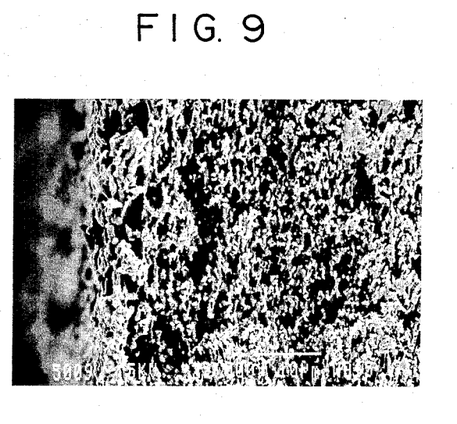
Figure 10:
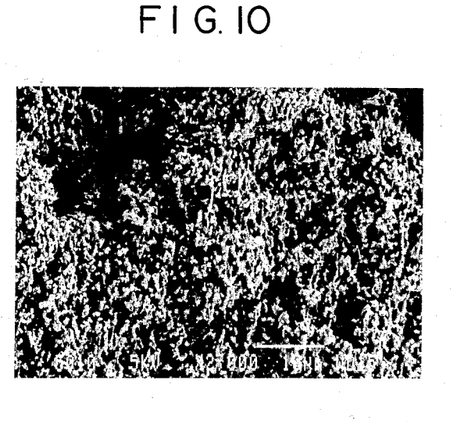

The membrane structure of the sample of Example 4 having a grafting ratio of 15.4% and that of the sample of Control 1 not having undergone the treatment for impartation of hydrophilicity were examined under an electron microscope. FIG. 3 is an electron photomicrograph of the outer surface of the sample of Example 4 (x 500), FIG. 4 is an electron photomicrograph of the cross section of the sample of Example 4 (x 500), FIGS. 5-6 are electron photomicrographs of the cross section of the sample of Example 4, FIG. 7 is an electron photomicrograph (x 500) of the outer surface of the sample of Control 1, FIG. 8 is an electron photomicrograph (x 500) of the cross section of the sample of Control 1, and FIGS. 9-10 are electron photomicrographs (x 2000) of the cross section of the sample of control 1. It is noted clearly from these electron photomicrographs that the membrane structures showed virtually no change before and after the grafting.

Figure 13:
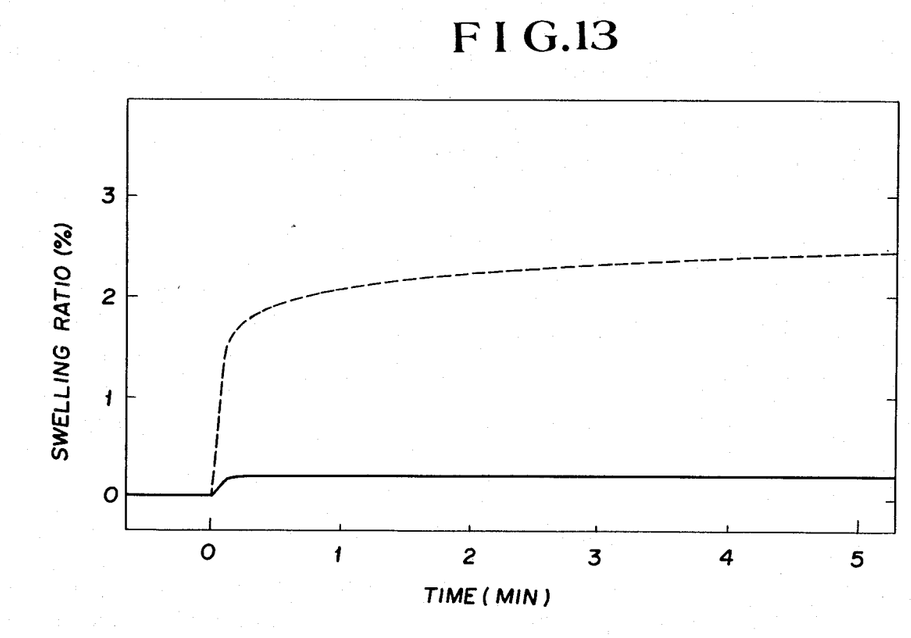
FIG. 13 is a chart showing the data obtained by the measurement with TMA.

Further, FIG. 13 shows the data obtained of the TMA determination of the swelling ratio (0.18%) of the sample of Example 4.

TABLE 1

| | Plasma irradiation time (sec.) | Graft polymerization time (min.) | Grafting ratio (%) | Bubble point (kg/cm) | Permeability to water (under 0.7 kg/cm) (ml/min cm) | Swelling ratio (%) |
|---|---|---|---|---|---|---|
| Control 1 | — | — | — | 1.19 | 0 | >0 |
| Example 1 | 10 | 20 | 13.25 | 1.32 | 2.2 | <0.2 |
| Example 2 | 30 | 10 | 10.18 | 1.25 | 3.3 | <0.2 |
| Example 3 | 10 | 20 | 20.05 | 1.48 | — | — |
| Example 4 | 5 | 20 | 15.38 | 1.30 | — | — |
| Example 5 | 20 | 30 | 18.14 | 1.50 | — | — |
| Example 6 | 10 | 30 | 22.87 | 1.70 | — | — |
| Example 7 | 10 | 20 | 13.53 | 1.32 | — | — |
| Example 8 | 20 | 20 | 24.38 | 1.56 | — | — |

Control 2

The same porous membrane of polypropylene as used in Example 1 was subjected to the treatment for impartation of hydrophilicity by following the procedure of Example 1, excepting the membrane for irradiation with plasma was set in place in the reaction vessel with the outer surface thereof kept in contact with the wall of the reaction vessel. The sample consequently obtained was found to have acquired hydrophilicity only on the outer side of the membrane. The surface of pores in the membrane interior acquired absolutely no hydrophilicity of the membrane to water was 0.

Control 3

The same porous membrane of polypropylene as used in Example 1 was irradiated with plasma by following the procedure of Control 2. The porous membrane after the plasma irradiation was placed in N,N-dimethyl acrylamide solution and left standing therein for graft reaction at 40° C. for 20 minutes.

Figure 11:
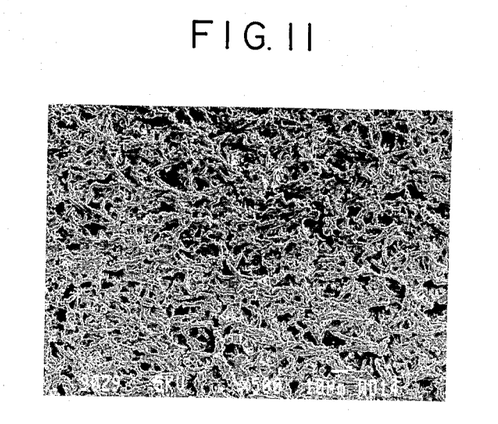
FIGS. 11-12 are electron photomicrographs showing the structures of a porous membrane for comparison.
Figure 12:
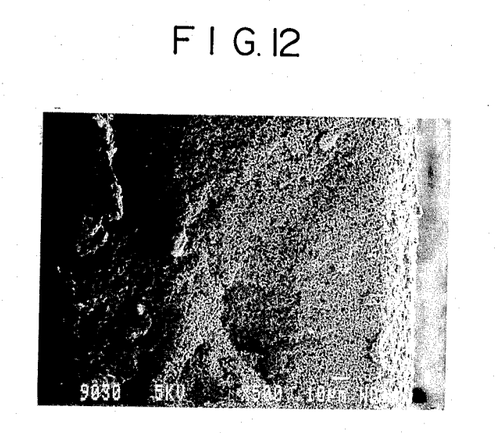

The sample thus obtained showed a grafting ratio of 67.5%. The impartation of hydrophilicity did not reach the membrane interior. Thus, the membrane showed a permeability of 0 to water. As noted from the electron photomicrograph of FIG. 11 showing the surface (x 500) and the of FIG. 12 showing the cross section (x 500), the pores on the outer surface were filled up with the grafted N,N-dimethyl acrylamide and the porous substrate part near the outer surface portion was deformed by the grafted layer.

EXAMPLE 9

As porous membrane (0.45 μm in pore diameter and 130 μm in wall thickness) of polyvinylidene fluoride prepared as a hydrophobic porous membrane was subjected, in the place of the porous membrane of polypropylene, to the treatment for impartation of hydrophilicity by following the procedure of Example 1. Consequently, N,N-dimethyl acrylamide was grafted to the porous membrane to give rise to a hydrophilic porous membrane having a grafting ratio of 12.4%. This membrane showed a bubble point of 1.54 kg/cm², a swelling ratio of 0.17%, and a permeability of 2.1 ml/min cm under a pressure of 0.7 kg/cm².

EXAMPLE 10

A hydrophobic porous membrane having an average pore diameter of 0.45 μm and a wall thickness of 160 μm was obtained by following the procedure of Example 1. A rectangle 6×7 cm was cut from the porous membrane and set in place inside a reaction vessel 30 mm in inside diameter in such a manner that it was kept out of contact with the wall of the reaction vessel. Under 0.1 Torr of argon gas, an electric power of 10 W generated by an induction coil connected to a 13.56 MHz high-frequency generator was applied to give rise to plasma, which was projected on the membrane for 3 seconds. After the plasma irradiation, N,N-dimethyl acrylamide gas was introduced into the reaction vessel and left standing therein at 20° C. under 1 Torr for 30 minutes for graft polymerization. The membrane consequently obtained was washed in a Soxhlet extractor using methanol as a solvent for 50 hours and vacuum dried. It was then found to possess a grafting ratio of 7.6%. It showed a swelling ratio of not more than 0.2%. The results of the observation under an electron microscope showed virtually no change in the membrane structure before and after the grafting.

The porous membrane thus obtained, without being subjected further to a treatment for impartation of hydrophilicity, was set in place within a plasma separator constructed as illustrated in FIG. 1 and a blood flow path thickness of 0.035 cm. Bovine blood was passed through the membrane by the single-pass method, with the feed rate varied, to determine the membrane's permeability to protein component of the plasma. As noted from the results shown in Table 2, the membrane showed a stable permeability of not less than 90%. During the course of the test, the membrane did not induce the phenomenon of hemolysis and exhibited a highly desirable capacity for permeation of blood plasma.

When a commercially available (Toyo Roshi K.K.) plasma separation membrane made of cellulose acetate and possessing an average pore diameter of 0.45 μm and a wall thickness of 160 μm was found to possess a swelling ratio of 1.44+0.98% (m=10). A typical set of TMA data are represented by the broken line in FIG. 13. When this plasma separation apparatus as used in Example 10 was put to use, the plasma separation membrane was swelled and creased with moisture so heavily as to obstruct the blood flow path and induce channeling.

Control 5

A porous membrane of polypropylene prepared by following the procedure of Example 10, without being subjected to graft polymerization, was used in the same apparatus as in Example 10. It was found to possess absolutely no capacity for filtration of blood plasma and a permeability of 0 to total protein of plasma.

TABLE 2

| Flow volume of plasma (ml/min.) | Permeability to total protein in plasma (%) | Amount of plasma filtered (ml/min cm mmHg) |
|---|---|---|
| 15 | 94.6 | $5.0 \times 10^{-4}$ |
| 25 | 94.9 | $5.7 \times 10^{-4}$ |
| 40 | 97.5 | $7.1 \times 10^{-4}$ |
| 65 | 97.5 | $8.9 \times 10^{-4}$ |

EXAMPLE 11

Controls 6–7

In a blood plasma separation apparatus constructed as illustrated in FIG. 1 and provided with a housing of polycarbonate, a porous membrane of polypropylene having N,N-dimethyl acrylamide graft polymerized (grafting ratio 9,91%) thereon in the same manner as in Example 1 (Example 11), a porous membrane of polypropylene undergone no treatment for impartation of hydrophilicity (Control 6), and a porous membrane of cellulose acetate similar to the membrane of Control 4 (Control 7) were each kept in contact with blood serum at 37° C. for one hour with the contact area of the membrane fixed at about 25 cm$^2$ per ml of blood serum. The blood serum was tested for $C_{3a}$ concentration by the RIA method. The results were as shown in Table 3.

TABLE 3

| | $C_{3a}$ concentration (ng/ml) |
|---|---|
| Before contact | 1,800 |
| After contact | |
| Housing (blank) made of polycarbonate | 6,600 |
| Membrane of N,N—dimethylamide grafted polypropylene (Example 11) | 3,000 |
| Membrane of polypropylene (Control 6) | 14,700 |
| Membrane of cellulose acetate (Control 7) | 27,000 |

As described above, this invention is directed to hydrophilic porous membrane which is characterized by a process of manufacture which comprises forming graft chains of a hydrophilic monomer on the surface of a hydrophobic porous membrane thereby imparting to the surface perfect hydrophilicity such that the produced membrane, when wetted, exhibits a swelling ratio of not more than 1% and a bubble point in the range of 0.5 to 8 kg/cm$^2$. The hydrophilic porous membrane, therefore, excels in such physical properties as dimensional stability and strength while in use and suffers sparingly from degradation of membrane qualities and finds utility in a wide range of applications. Further in the hydrophilic porous membrane of the present invention, when the graft chains of the hydrophilic monomer are those which are formed on the surface of the porous membrane mentioned above by irradiating the hydrophobic porous membrane with plasma with the outer surface of the porous membrane held in an unstrained state and then graft polymerizing the hydrophilic monomer supplied in a gaseous state, these graft chains are stably retained owing to the hydrophilicity possessed by the porous membrane mentioned above and allowed to function advantageously. Further, the hydrophilic porous membrane of this invention enjoys more desirable physical properties and more satisfactory pore characteristics when the grafting ratio is in the range of 2 to 30%, the hydrophobic porous membrane is made of a polyolefin or a partially chlorinated or fluorinated polyolefin, preferably polypropylene or polyvinylidene fluoride, the thickness of the membrane is in the range of 20 to 250 μm, the hydrophilic monomer is N,N-dimethyl acrylamide, the swelling ratio is in the range of 0 to 0.5% and the bubble point is in the range of 0.8 to 2.0 kg/cm$^2$ when wetted.

This invention is also directed to a method for the production of a hydrophilic porous membrane, by the steps of irradiating the outer surface of a hydrophobic porous membrane in an unstrained state with plasma and subsequently supplying a hydrophilic monomer in a gaseous state thereby enabling the hydrophilic monomer to be graft polymerized on the surface of the porous membrane. Thus, this invention can provide the hydrophilic porous membrane possessing such outstanding properties as described above safely and inexpensively without requiring use of a large plant. By this method, the hydrophilic porous membrane can be produced more reliably with more desirable properties when the thickness of the hydrophobic porous membrane is in the range of 20 to 250 μm, the hydrophobic porous membrane possesses no skin layer on the outer surface portion thereof, the hydrophobic porous membrane possesses as an average pore diameter in the range of 0.05 to 1.0 μm, the hydrophobic porous membrane is made of a polyolefin or partially chlorinated or fluorinated polyolefin, preferably polypropylene or polyvinylidene fluoride, and the hydrophilic monomer is N,N-dimethyl acrylamide.

The present invention is further directed to a blood plasma separation apparatus, characterized by possessing as a blood plasma separation membrane, a hydrophilic porous membrane which is characterized by a process of manufacture which comprises forming graft chains of a hydrophilic monomer on the surface of a hdyrophobic porous membrane thereby imparting to the surface perfect hydrophilicity such that the produced membrane, when wetted, exhibits a swelling ratio of not more than 1% and a bubble point in the range of 0.6 to 2.0 kg/cm$^2$. This blood plasma separation apparatus possesses a high capacity for filtration of blood plasma and a high permeability to total protein of blood plasma and permits perfect separation of blood into blood corpuscle component and blood plasma component without requiring any additional treatment for impartation of hydrophilicity. Thus, it can be advantageously utilized for the therapy of diseases and in the field of blood donation. The apparatus offers more desirable performance when the permeability to the total protein component of blood plasma is so high as to exceed 90%. The possibility of the apparatus activating the complementary component of the blood under treatment is lowered when the hydrophilic monomer is 2-hydroxyethyl methacrylate or N,N-dimethyl acrylamide.

What is claimed is:

1. A hydrophilic porous membrane which is characterized by a process of manufacture which comprises forming graft chains of a hydrophilic monomer on the surface of a hydrophobic porous membrane and on the inner surface of the pores, wherein the grafting ratio is in the range of 2 to 30%, thereby imparting to said surfaces perfect hydrophilicity such that the produced membrane, when wetted, exhibits a swelling ratio of not more than 1% and a bubble point in the range of 0.5 to 8 kg/cm$^2$.

2. A hydrophilic porous membrane according to claim 1, wherein said hydrophobic porous membrane is made of a polyolefin or a partially chlorinated or fluorinated polyolefin.

3. A hydrophilic porous membrane according to claim 2, wherein said hydrophobic porous membrane is made of polypropylene.

4. A hydrophilic porous membrane according to claim 1, wherein said hydrophobic porous membrane is made of polyvinylidene fluoride.

5. A hydrophilic porous membrane according to claim 1, wherein the thickness of said membrane is in the range of 20 to 250 μm.

6. A hydrophilic porous membrane according to claim 1, wherein said hydrophobic porous membrane possesses no skin layer on the outer surface portion thereof.

7. A hydrophilic porous membrane according to claim 1, wherein said hydrophilic monomer is N,N-dimethyl acrylamide.

8. A method for the production of a hydrophilic porous membrane, said method comprising irradiating the outer surface of a hydrophobic porous membrane in an unstrained state with plasma and subsequently supplying a hydrophilic monomer in a gaseous state thereby enabling said hydrophilic monomer to be graft polymerized on the surface of said porous membrane and on the inner surface of the pores, wherein the grafting ratio is in the range of 2 to 30%.

9. A method according to claim 8, wherein said hydrophobic porous membrane possesses a wall thickness in the range of 20 to 250 $\mu$m.

10. A method according to claim 8, wherein said hydrophobic porous membrane possesses an average pore diameter in the range of 0.05 to 1.0 $\mu$m.

11. A method according to claim 8, wherein said hydrophobic porous membrane is made of a polyolefin or a partially chlorinated or fluorinated polyolefin.

12. A method according to claim 11, wherein said hydrophobic porous membrane is made of polypropylene.

13. A method according to claim 8, wherein said hydrophobic porous membrane is made of polyvinylidene fluoride.

14. A method according to claim 8, wherein said hydrophilic monomer is N,N-dimethyl acrylamide.

15. A plasma separator comprising a plasma separation membrane, wherein said plasma separation membrane is a hydrophilic porous membrane which is a process of manufacture which comprises forming graft chains of a hydrophilic monomer on the surface of a hydrophobic porous membrane and on the inner surface of the pores, wherein the grafting ratio is in the range of 2 to 30%, thereby imparting to the surfaces perfect hydrophilicity such that the produced membrane, when wetted, exhibits a swelling ratio of not more than 1% and a bubble point in the range of 0.5 to 8 kg/cm$^2$.

16. A plasma separator according to claim 15, wherein said plasma separation membrane possesses a permeability of not less than 90% to total protein component of blood plasma.

17. A plasma separator according to claim 15, wherein said blood plasma separation membrane is a hydrophilic porous membrane produced by a process which comprises irradiating the outer surface of a hydrophobic porous membrane in an unstrained state with plasma and subsequently causing a hydrophilic monomer supplied in a gaseous form to be graft polymerized onto the surface of said hydrophobic porous membrane and allowing the graft chains formed consequently on the surface of said hydrophobic porous membrane to impart perfect hydrophilicity to said hydrophobic porous membrane to impart perfect hydrophilicity to said hydrophilic porous membrane.

18. A plasma separator according to claim 15, wherein said hydrophobic porous membrane is made of a polyolefin or a partially chlorinated or fluorinated polyolefin.

19. A plasma separator according to claim 18, wherein said hydrophobic porous membrane is made of polypropylene.

20. A plasma separator according to claim 15, wherein said hydrophobic porous membrane is made of polyvinyl fluoride.

21. A plasma separator according to claim 15, wherein said hydrophilic monomer is 2-hydroxyethyl methacrylate or N,N-dimethyl acrylamide.

22. A plasma separator according to claim 15, wherein said membrane has a wall thickness in the range of 20 to 250 $\mu$m.

23. A plasma separator according to claim 15, wherein said hydrophilic porous membrane, when wetted, shows a swelling ratio in the range of 0 to 0.5% and a bubble point in the range of 0.8 to 2.0 kg/cm$^2$.

* * * * *